US010848058B2

United States Patent
Ippolito

(10) Patent No.: US 10,848,058 B2
(45) Date of Patent: Nov. 24, 2020

(54) CIRCUIT AND METHOD FOR OPERATING A CHARGE PUMP

(71) Applicant: STMicroelectronics S.r.l., Agrate Brianza (IT)

(72) Inventor: Calogero Marco Ippolito, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/797,643

(22) Filed: Oct. 30, 2017

(65) Prior Publication Data

US 2018/0212514 A1    Jul. 26, 2018

(30) Foreign Application Priority Data

Jan. 24, 2017 (IT) .................. 102017000007428

(51) Int. Cl.
*H02M 3/07* (2006.01)
*H02M 1/15* (2006.01)
*H02M 1/00* (2006.01)

(52) U.S. Cl.
CPC ............ *H02M 3/07* (2013.01); *H02M 1/15* (2013.01); *H02M 2001/0003* (2013.01); *H02M 2001/0045* (2013.01)

(58) Field of Classification Search
CPC ..................................... H02M 3/07
See application file for complete search history.

(56) References Cited

U.S. PATENT DOCUMENTS

| 5,874,850 | A | 2/1999 | Pulvirenti et al. |
| 7,554,311 | B2 * | 6/2009 | Pan ................ G11C 5/145 323/275 |
| 7,764,525 | B2 | 7/2010 | Hsieh et al. |
| 7,944,277 | B1 * | 5/2011 | Sinitsky ............ G05F 1/56 327/536 |
| 9,276,464 | B2 * | 3/2016 | Chu ................ H02M 3/07 |
| 2002/0034082 | A1 | 3/2002 | Yokomizo et al. |
| 2005/0189983 | A1 | 9/2005 | Slyer et al. |
| 2006/0181340 | A1 | 8/2006 | Dhuyvetter |

(Continued)

FOREIGN PATENT DOCUMENTS

| CN | 1882895 A | 12/2006 |
| CN | 102005917 A | 4/2011 |

(Continued)

*Primary Examiner* — Lincoln D Donovan
*Assistant Examiner* — Colleen J O Toole
(74) *Attorney, Agent, or Firm* — Slater Matsil, LLP

(57) ABSTRACT

An embodiment circuit includes a charge pump configured to receive an input voltage at an input terminal, and a clock signal at a clock input, the charge pump being further configured to produce a first output voltage that is a multiple of the input voltage by a factor N. The circuit further includes an input stage including a reference terminal configured to receive a reference voltage, and an output terminal configured to provide the input voltage to the charge pump. The circuit also includes a capacitive element coupled to the charge pump and chargeable to a second output voltage, and a feedback network including a first feedback loop configured to feed back the first output voltage to an input of the input stage, and a second feedback loop configured to maintain a fixed offset between the first output voltage and the second output voltage.

23 Claims, 3 Drawing Sheets

(56) References Cited

U.S. PATENT DOCUMENTS

2014/0167713 A1  6/2014  Choi
2015/0192943 A1  7/2015  Roham et al.
2016/0181913 A1  6/2016  Feng

FOREIGN PATENT DOCUMENTS

CN   105915046 A   8/2016
EP   0846996 A1    6/1998
EP   2065780 A1    6/2009
WO   2008016571 A1 2/2008

* cited by examiner even if not necessarily referring to the same embodiment, which can be present in one or more points of this description, is intended to indicate that a particular configuration, structure, or characteristic.

CIRCUIT AND METHOD FOR OPERATING A CHARGE PUMP

CROSS-REFERENCE TO RELATED APPLICATIONS

This application claims priority to Italian Patent Application No. 102017000007428, filed on Jan. 24, 2017, which application is hereby incorporated herein by reference.

TECHNICAL FIELD

The description relates generally to charge pumps, and in particular embodiments to a circuit and a method for operating a charge pump.

BACKGROUND

Charge pump circuits are components capable of performing an important role in a number of electronic devices, being able to be used to obtain, from a supply voltage, higher-value positive and negative voltages.

They can therefore be used (by way of example—and with the embodiments not intended to be limiting) in MEMS devices, communications interfaces (for example, the RS-232 standard), smartphones and other mobile devices, computers, regulators and voltage converters. They can be used in the driving of liquid crystals (LCDs) or light-emitting diodes (LEDs), for example to generate high polarizing voltages from a lower supply voltage. Furthermore, they can be used in memories (for example, flash memories) to generate pulses for erasing data.

In summary, charge pumps are circuits capable of generating one or more voltage levels, multiplying the voltage placed at the input to the same charge pump by a determined multiple (e.g., an integer). They can therefore be used (for example, in applications such as those mentioned above) to generate a voltage independent of the supply voltage and constant while the same supply voltage varies.

The output voltage of a charge pump can be affected by a residual ripple at the clock frequency fCLK with which the same charge pump is switched.

For example, a charge pump used to generate the voltage to drive a switched capacitor circuit can operate with a higher clock frequency fCLK than the frequency fSC of the signals for driving the switched capacitor circuit, with noise sampled on the capacitors at the end of the sampling phase.

The ripple on the output voltage of the charge pump can be transferred through the parasitic capacitances of the switches and may be unacceptable for some applications, for example in low-noise circuit applications.

The introduction of techniques capable of reducing the ripple superimposed on the output voltage of a charge pump (for example, at the sampling intervals) can therefore allow the possible use of a charge pump in applications in which noise performance is also considered to be important.

SUMMARY

One or more embodiments relate to charge pumps that can be used in a wide range of possible applications, including sensors of various kinds, for example pressure, humidity and temperature sensors.

Despite extensive activity in the sector, as documented for example in various documents mentioned hereafter, the demand for improved solutions, for example in relation to the reduction in the output ripple, is still perceived.

One or more embodiments meet this demand.

According to one or more embodiments, this aim can be achieved by virtue of a circuit having the characteristics referred to in the claims that follow.

One or more embodiments can relate to a corresponding device (for example, among those mentioned above) as well as a corresponding method.

One or more embodiments can provide a residual ripple which is not attenuated solely by the effect of the output capacitance.

One or more embodiments can provide for placing a charge pump inside a feedback system, i.e. of the closed-loop type, with the feedback system capable of including two control loops.

One or more embodiments can provide for strongly attenuating the residual ripple on the output voltage of a charge pump (for example, at the switching frequency) using values for the output capacitance that are small and therefore which can be implemented without too much difficulty.

In the presence of variations in current through the load, one or more embodiments can dynamically detect the output voltage and perform a feedback providing a correct current gain from the charge pump.

One or more embodiments can notably reduce the ripple at the clock frequency caused by the switching of the pump switches without having to increase the output capacitance.

One or more embodiments can be generalized to the case of any gain N with respect to the reference voltage at the input.

One or more embodiments can provide for producing a first feedback of the output of the charge pump in conjunction with a second feedback aiming at maintaining (for example, by a transistor such as a MOSFET) a fixed difference between the output voltage of the charge pump and the overall output voltage of the circuit.

One more embodiments can comprise an LDO (Low Dropout) type output configuration.

BRIEF DESCRIPTION OF THE DRAWINGS

One or more embodiments will now be described, purely by way of non-limiting example, with reference to the accompanying figures, in which.

DETAILED DESCRIPTION OF ILLUSTRATIVE EMBODIMENTS

Figure 1:
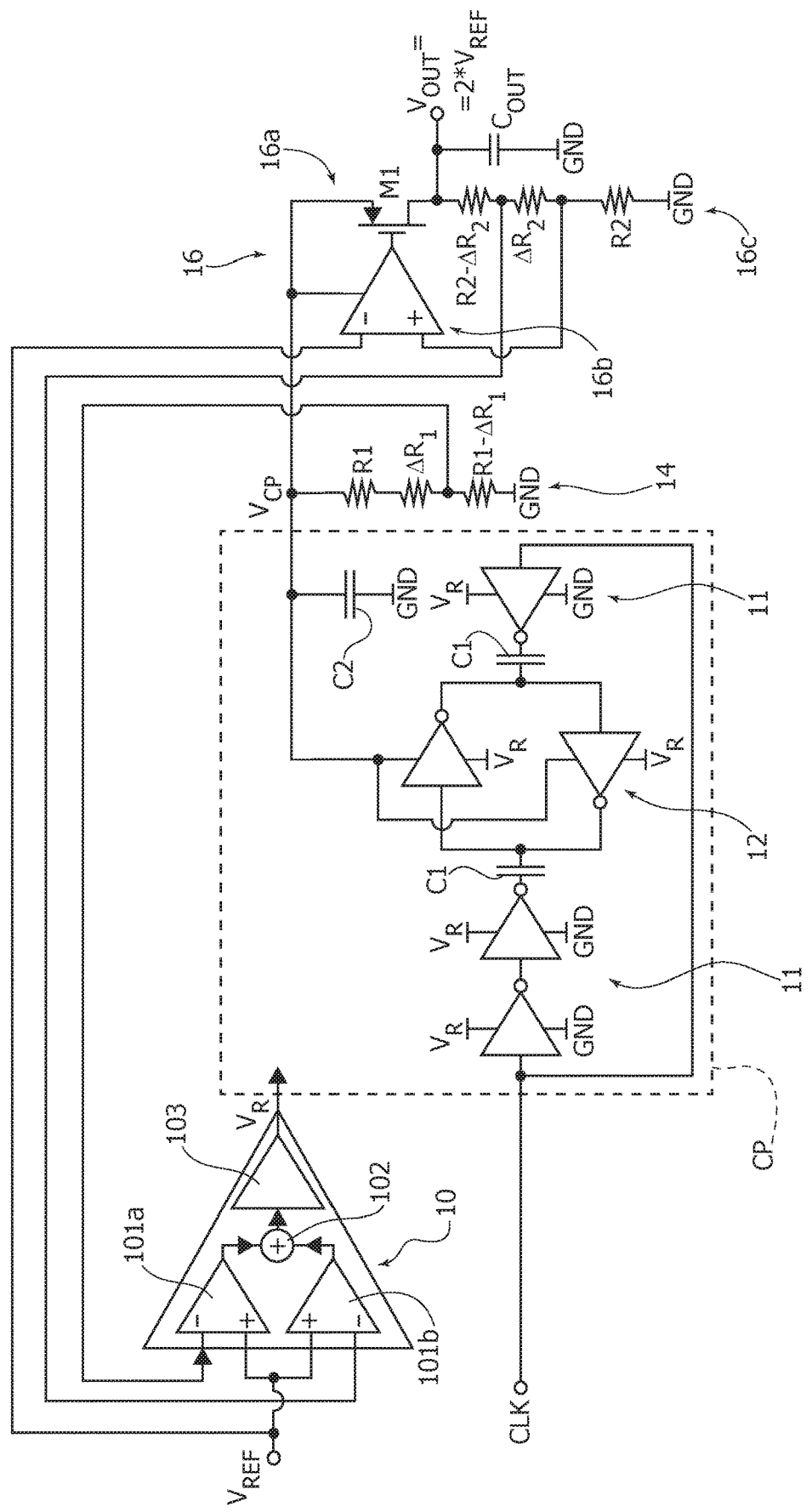
FIG. 1 is a circuit diagram exemplifying possible embodiments.

In the description that follows, one or more specific details are illustrated with the aim of providing an in-depth understanding of the examples of the embodiments of this description. The embodiments can be obtained without one or more of the specific details, or using other methods, components, materials, etc. In other cases, operations, materials or known structures are not illustrated or described in detail such that certain aspects of the embodiments will be made clear.

Reference to "one embodiment" within the framework of the present description is intended to indicate that a particular configuration, structure or characteristic described with reference to the embodiment is included in at least one embodiment. Therefore, phrases like "in one embodiment"

which can be present in one or more points of the present description do not necessarily refer specifically to the same embodiment. Furthermore, particular shapes, structures or characteristics can be combined in any suitable manner in one or more embodiments.

The references used here are provided simply for convenience and therefore do not define the scope of protection or the importance of the embodiments.

As has already been mentioned, charge pumps have formed the subject of widespread activities of study and innovation, from elementary solutions such as the one known in the literature as a "Two-Phase Voltage Doubler", or TPVD (with the charge accumulated in successive phases on a first and a second capacitor used to "pump" the charge onto an output capacitor), to more sophisticated solutions such as, for example, the one described in U.S. Pat. No. 5,874,850 A.

In this solution, if the charge pump is used to drive circuits which do not absorb current, the output voltage is double the input voltage. If instead the circuit driven by the charge pump absorbs a current level different from zero and increasing, then the output voltage of the charge pump tends to reduce with a ripple due to the switching of the two operating phases superimposed on the output voltage.

These solutions are examples of open-loop solutions, in which the input voltage is not adjusted so as to hold the output voltage constant independently of the current absorbed by the circuit driven by the charge pump.

Other charge pump solutions are described in documents such as U.S. Pat. No. 7,764,525 B2, U.S. Patent Publication No. 2006/0181340 A1 or U.S. Patent Publication No. 2016/0181913 A1.

These solutions insert the charge pump in a feedback loop, i.e. they are closed-loop solutions, with the feedback circuit which can modify the reference signal of the charge pump aiming to make sure that the average value of the output of the charge pump is constant independently of the current level absorbed by the circuit connected as load.

With a determined load current value fixed, the ripple caused by the switching (at the frequency $f_{CLK}$) can be reduced (only) by increasing the output capacitance. At least in principle, in low-noise applications, in which it is desired to reduce this ripple as far as possible, consideration could be given to reducing the ripple to the desired level by suitably increasing the value of the output capacitance.

This value can however not be realizable or require the occupation of an area (and therefore a cost) that is incompatible with the application demands or usage demands.

In one or more embodiments, provision can be made to insert a charge pump in an implementation circuit, as exemplified in the figures, where the reference CP indicates a charge pump.

For example, this can be, in one or more embodiments as exemplified in FIG. 1, a charge pump with multiplication by a factor of 2.

In one or more embodiments, to realize the pump CP, it is possible to adopt various circuit diagrams, to be considered as known per se (see, for example, the documents mentioned previously), which makes it unnecessary to provide a description here in greater detail.

By way of summary, for example a charge pump circuit can be considered, as exemplified in FIG. 1, in which two first capacitors C1 are charged from a voltage $V_R$ (capable of being obtained, for example, from a reference voltage $V_{REF}$ by a differential input stage 10) through respective inverter stages 11 clocked by a clock signal CLK and with a second inverter stage 12 which "pumps" the charge that is on the capacitors C1 onto a second capacitor C2, across which there is a voltage $V_{CP}$ multiplied by 2 with respect to the input $V_R$.

Reference to such a circuit is of course purely exemplary and non-limiting in nature for the embodiments.

One or more embodiments can in fact use charge pump circuits of different types, this being applicable also to the charge pumps CP exemplified in FIGS. 2 and 3 (which will be returned to later), which, instead of being charge pumps with multiplication by 2, can be charge pumps—of a type that are known per se—with multiplication by N, including, for example, a cascade of N−1 stages of the type described above by way of summary.

Figure 2:
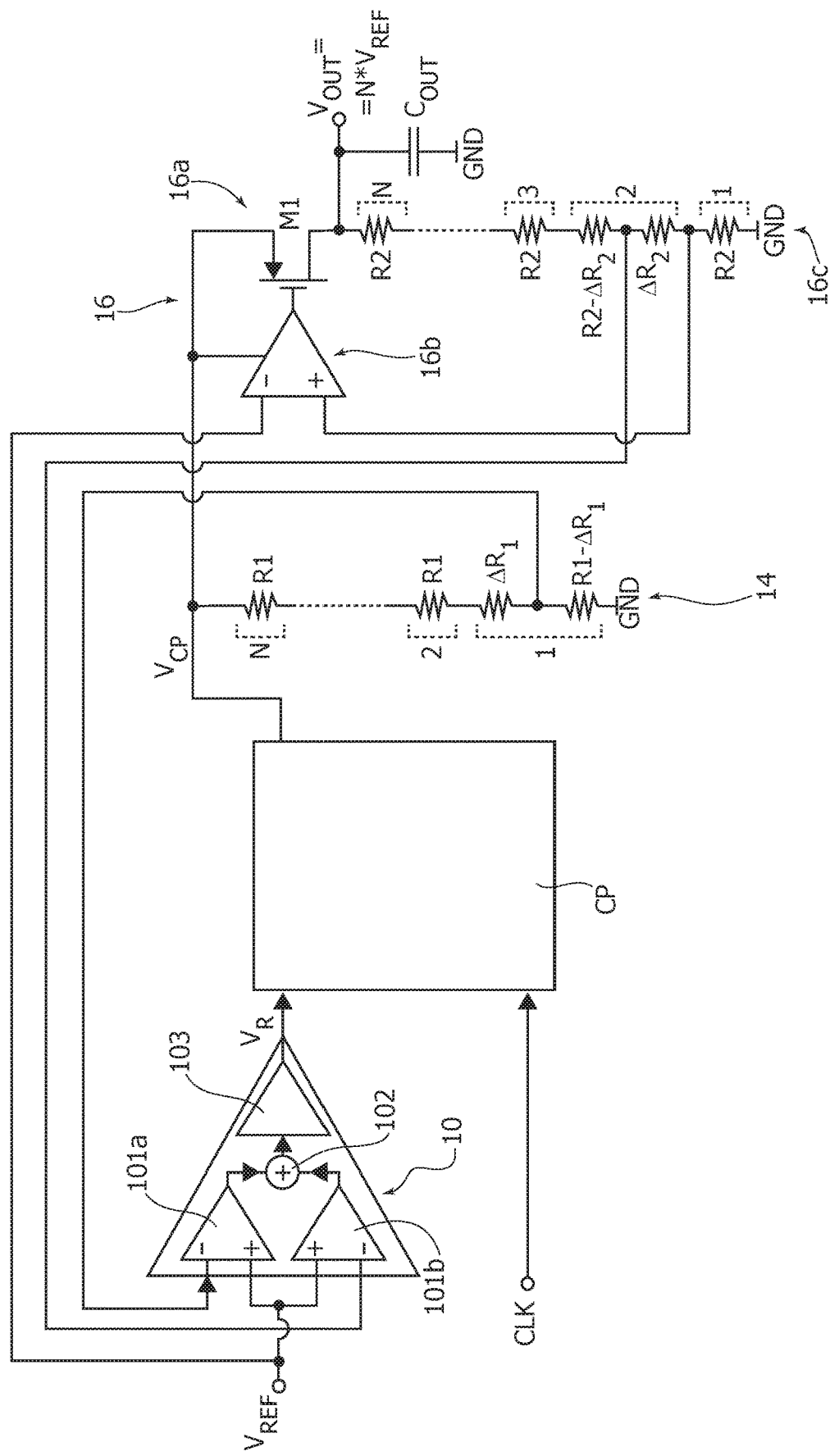
FIG. 2 is another circuit diagram exemplifying possible embodiments.
Figure 3:
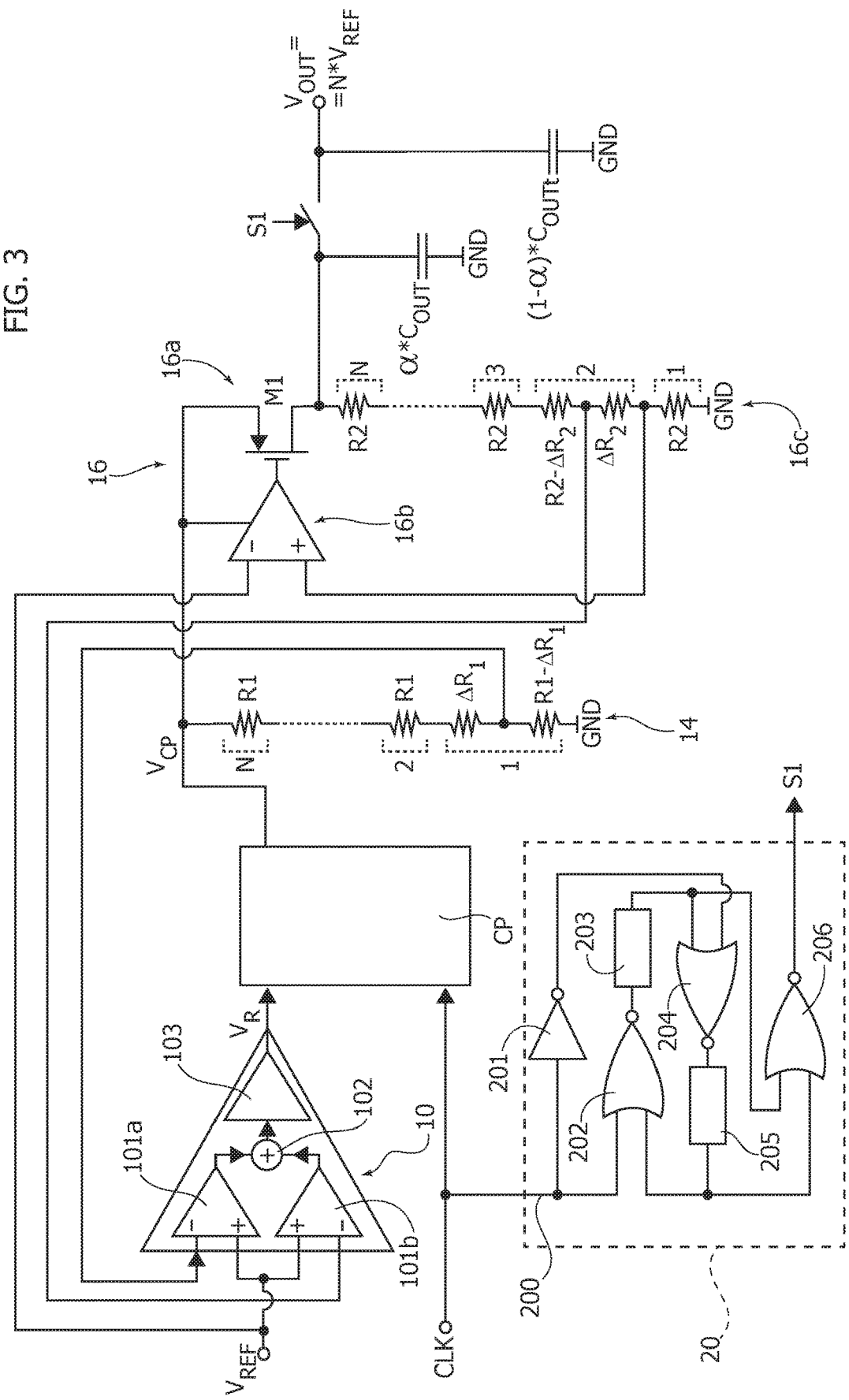
FIG. 3 is yet another circuit diagram exemplifying possible embodiments.

In one or more embodiments, the overall output of the circuit at the voltage $V_{OUT}$ (which it is desired to be equal, for example, to 2 times $V_{REF}$ in FIG. 1 or to N times $V_{REF}$ in FIGS. 2 and 3) can be provided on an output capacitor $C_{OUT}$ with the provision—between the output of the charge pump CP at the voltage $V_{CP}$ and the overall output of the circuit at the voltage $V_{OUT}$—of a circuit configuration capable of realizing two feedback control loops and substantially comparable to a low dropout (LDO) configuration.

In one or more embodiments, the first feedback loop can include a (first) resistive voltage divider 14 including a plurality of resistors connected in series between the output of the charge pump CP on which the voltage $V_{CP}$ is present and ground GND, with an overall value of resistance equal to N times $R_1$, where N represents the multiplication value of the charge pump CP (equal to 2 in the case of FIG. 1, and N in the case of FIGS. 2 and 3).

In one or more embodiments, as exemplified in the figures (and referring to the more general case of FIGS. 2 and 3, with the multiplication factor of the charge pump CP equal to N), the divider 14 can ideally be seen as including N resistors, each with resistance value $R_1$, one of which (for example the one connected to ground) is divided into two portions with resistance values equal to $R_1 \times \Delta R_1$ and $\Delta R_1$ respectively.

A voltage approximately equal to a submultiple N of $V_{CP}$ (i.e. equal to 1/N times $V_{CP}$) can be detected across the resistance $R_1-R_1$ and brought back as input—according to methods discussed hereinafter—to the differential stage 10 which generates $V_R$ from $V_{REF}$. Referring to a voltage as "approximately" equal to a submultiple N of $V_{CP}$ takes into account the effect of the deviation with respect to $R_1$ given by $\Delta R_1$.

In one or more embodiments, provision can be made for a second feedback control loop capable of acting so as to maintain a fixed difference $\Delta V$ between the voltage $V_{CP}$ and the voltage $V_{OUT}$. For example (with reference to the polarities of the signals and of the components considered by way of example in the figures), the second feedback control loop can act so as to maintain the voltage $V_{CP}$ at a higher value, for example by an amount $\Delta V$ with respect to the voltage $V_{OUT}$, so as to facilitate the correct operation of an output transistor (for example, MOS) 16a.

In one or more embodiments, the transistor 16a can be positioned with its current path (for example, source-drain, in the case of a field-effect transistor such as a MOSFET) between the output of the charge pump CP at the voltage $V_{CP}$ and the overall output voltage $V_{OUT}$ of the circuit. The transistor 16a may further be positioned such that its control terminal (for example, gate, in the case of a field-effect transistor such as a MOSFET) is coupled to the output of a differential stage 16b (for example, an operational amplifier) which senses, between its inverting and non-inverting inputs, the difference between the reference voltage $V_{REF}$ and a voltage equal to 1/N times $V_{OUT}$ where N represents the multiplication value of the charge pump CP (equal to 2 in the case of FIG. 1, and N in the case of FIGS. 2 and 3).

In one or more embodiments, the abovesaid voltage equal to 1/N times $V_{OUT}$ can be obtained by a resistive divider 16c similar overall to the divider 14 already described previously.

For example, in one or more embodiments, as exemplified in the figures (and referring again to the more general case of FIGS. 2 and 3, with the multiplication factor of the charge pump CP equal to N), the divider 16c can ideally be seen as including N resistors, each with resistance value $R_2$, one of which (for example the second from the one connected to ground) is divided into two portions with resistance values equal to $R_2-\Delta R_2$ and $\Delta R_2$ respectively.

A voltage equal to a submultiple N of $V_{OUT}$ (i.e. equal to 1/N times $V_{OUT}$) can be detected across the resistor of value $R_2$ connected to ground GND and brought to the input (for example, non-inverting) of the differential stage 16b.

At the same time, a voltage approximately equal to a submultiple N of $V_{OUT}$ (i.e. equal to 1/N times $V_{OUT}$) can be detected on the resistance $R_2+\Delta R_2$ and brought back as input—also here according to methods discussed later—to the differential stage 10 which generates $V_R$ from $V_{REF}$. Again referring here to a voltage as "approximately" equal to a submultiple N of $V_{CP}$ takes into account the effect of the deviation with respect to $R_2$ given by $\Delta R_2$.

In one or more embodiments, the attenuation of the ripple of the closed-loop charge pump configuration can be facilitated not only by virtue of the filtering effect of the output capacitance $C_{OUT}$, but also by virtue of the attenuating effect of the "Power Supply Rejection Ratio" (PSRR) of the LDO type circuit configuration described previously.

In one or more embodiments, the additional attenuation being derived from the PSRR contribution can be added to the filtering effect of the capacitance $C_{OUT}$, with the advantage of being able to strongly attenuate the ripple signal even by using reduced values of the output capacitance $C_{OUT}$.

In one or more embodiments, a high value can be chosen for the resistances $R_1$ and $R_2$, so as to reduce the current consumption of the resistive dividers 14 and 16c produced using these resistances.

In one or more embodiments, provision can be made for the differential stage 10 which generates $V_R$ from $V_{REF}$ to include two differential pairs 101a, 101b capable of producing a transconductance gain $g_m$ and to receive, on a first input (for example, non-inverting), the voltage $V_{REF}$ and, on a second input (for example, inverting), the voltage "tapped" on the divider 14 via the resistance of value $R_1-\Delta R_1$ connected to ground GND. The second input may further receive the voltage "tapped" on the divider 16c via the resistance of value $R_2+\Delta R_2$ given by the series connection of the resistor of value $R_2$ connected to ground GND (to which there is also coupled the differential stage 16b which drives the transistor 16a) and the resistor of value $\Delta R_2$.

In one or more embodiments, the outputs of the two differential circuits 101a, 101b can be summed in a summing node 102 (for example, with current mirror) to generate the voltage $V_R$ across a unity-gain stage 103.

In one or more embodiments (in the case of the pump CP with multiplication by 2 exemplified in FIG. 1), it is possible to dimension the value of $\Delta R1$ and $\Delta R2$ (i.e. of the two "deviations" of the resistive values with respect to the values R1 and R2 linked to the multiplication factor of the charge pump CP) as follows:

$$\begin{cases} \Delta R_1 = \dfrac{2*R_1*\Delta V}{2*V_{REF}+\Delta V} \\ \Delta R_2 = \dfrac{R_2*\Delta V}{2*V_{REF}} \end{cases}$$

where $\Delta V$ indicates the difference between VCP and VOUT, i.e., for example, the amount by which VCP can be maintained higher than the voltage VOUT.

The combined effect of the two control loops described previously can then be expressed (in the case exemplified in FIG. 1) by the following relationships:

$$\left(V_{REF} - \frac{V_{CP}}{2} * \frac{V_{REF}*2-\Delta V}{V_{REF}*2+\Delta V}\right) + \left(V_{REF} - \frac{V_{OUT}}{2} * \frac{V_{REF}*2+\Delta V}{V_{REF}*2}\right) = 0$$

$$V_{OUT} = 2*V_{REF}$$

for which the first relationship can be seen as fixed by the differential stage 10 and the second by the action of the amplifier 16b and of the transistor 16a.

This is all with the voltage $V_{CP}$ maintained (for example, higher) at a level of difference $\Delta V$ with respect to the voltage $V_{OUT}$, thus ensuring the correct operation of the output transistor 16a (for example, with $\Delta V$ greater than or equal to the saturation source-drain voltage $V_{SDsat}$ of the transistor 16a).

In one or more embodiments (in the more general case of the pump CP with multiplication by N exemplified in FIGS. 2 and 3), it is possible to dimension $\Delta R_1$ and $\Delta R_2$ as follows:

$$\begin{cases} \Delta R_1 = \dfrac{2*R_1*\Delta V}{N*V_{REF}+\Delta V} \\ \Delta R_2 = \dfrac{R_2*\Delta V}{N*V_{REF}} \end{cases}$$

with the combined effect of the two control loops capable of being expressed (in the case exemplified in FIGS. 2 and 3) by the following relationships:

$$\left(V_{REF} - \frac{V_{CP}}{N} * \frac{V_{REF}*N-\Delta V}{V_{REF}*N+\Delta V}\right) + \left(V_{REF} - \frac{V_{OUT}}{N} * \frac{V_{REF}*N+\Delta V}{V_{REF}*N}\right) = 0$$

and $$V_{OUT} = N*V_{REF}$$

once again with the first relationship capable of being seen as fixed by the differential stage 10 and the second by the action of the amplifier 16b and of the transistor 16a and with the voltage $V_{CP}$ maintained (for example, higher) at a level of difference $\Delta V$ with respect to the voltage $V_{OUT}$, thus ensuring the correct operation of the output transistor 16a (for example with $\Delta V$ greater than or equal to the saturation source-drain voltage $V_{SDsat}$ of the transistor 16a).

In one or more embodiments, it is likewise possible to realize the operational amplifier 16b of the LDO configuration such that the absorption of current by the output of the charge pump CP (at the voltage VCP) is minimum.

FIG. 3 exemplifies (with reference to the diagram of FIG. 2, but this possibility applies also to the diagram of FIG. 1) the possibility, in one or more embodiments, of providing a switching edge filtering circuit 20 sensitive to the clock signal CLK of the charge pump CP. FIG. 3 also shows dividing the output capacitance COUT into two pails, indicated respectively by α.COUT and (1-α).COUT separated by a switch S1 driven by a sampling signal capable of being generated by the circuit 20.

In one or more embodiments, the insertion of the circuit 20 enables a further reduction of the ripple superimposed on the output signal at the clock frequency fCLK.

In one or more embodiments, the value of the division factor α can be chosen (for example, as a function of the application context and usage context) to be the value (between 0 and 1) which minimizes the abovesaid ripple.

In one or more embodiments, the circuit 20 can "read" the clock signal CLK of the charge pump and generate the signal which drives the switch S1 which divides the output capacitance COUT into two.

For example, in one or more embodiments, the circuit 20 can include an input line 200 which receives the signal CLK, sending it to a logic inverter 201 and to one of the inputs of a NOR gate 202. The circuit 20 also includes a delay 203 of duration TD on the output of the NOR gate 202 and a further NOR gate 204 which receives as input the output of the inverter 201 and the output of the delay 203. The circuit 20 also includes a further delay 205 of duration TD on the output of the NOR gate 204, the output of which is sent back to the other input of the NOR gate 202 and to one of the inputs of yet another NOR gate 206 which receives on its other input the output of the delay 203 and in turn provides as output the signal for driving the switch S1.

In one or more embodiments, the circuit 20 can therefore open the switch S1 for a brief time interval at the switching edge of the clock signal CLK, thus reducing the propagation of the ripple signal at the output.

Although exemplified here with reference to the circuits of FIGS. 1 and 2, in one or more embodiments the solution referred to in FIG. 3 (circuit 20 which drives the switch S1 acting between the two parts of the output capacitance) can also be used alone, therefore also together with conventional type charge pump topologies.

When used in combination with circuits as exemplified in FIGS. 1 and 2, the filtering effect of this solution adds to the filtering action on the ripple that can be produced by the PSRR of the output stage of these circuits, facilitating a further improvement of the ripple signal rejection performance.

In one or more embodiments used, for example, to drive switched capacitor circuits, it could be observed that the transient response after a current spike at the output is dictated primarily by the free-running operation of the charge pump without affecting the noise performance of the capacitors with the residual ripple at the sampling intervals duly reduced.

Under these conditions of reduced residual ripple at the sampling intervals, it is possible to take advantage of the free-running operation (i.e. in the absence of frequency modulation phenomena of the charge pump which are induced by load current demands), with a resultant reduction in current consumption.

One or more embodiments can therefore relate to a circuit including a charge pump (for example, CP) with an input voltage (VR) and an output voltage (VCP) which is a multiple N (for example, equal to 2 in FIG. 1, and equal in general to N in FIGS. 2 and 3) of the input voltage. The charge pump may have a clock input (for example, CLK), an input stage (for example differential stage 10) with a reference terminal for receiving a reference voltage (VREF) and an output terminal coupled to the charge pump (CP) for applying the input voltage to the charge pump. The charge pump further includes at least one output capacitance (for example, COUT) coupled (for example, in voltage dividers 14, 16) to the charge pump and chargeable to an output voltage (VOUT) of the circuit. The circuit includes a feedback network including a first feedback loop (for example, voltage divider 14) for feeding back the output voltage of the charge pump towards the input of the input stage and a second feedback loop (for example, circuit elements 16a, 16b, 16c) for maintaining a fixed offset between the output voltage of the charge pump and the output voltage of the circuit. Additionally or alternatively, the output capacitance is divided between two output capacitors (for example, α.COUT; (1-α).COUT) with a switch (for example, S1) set between the two output capacitors and with a driver circuit (for example, circuit 20) for driving the switch coupled to the clock input of the charge pump, the switch being openable (i.e. capable of being made non-conductive, uncoupling the two output capacitors from each other) by the driver circuit at switching edges of the clock signal at the clock input of the charge pump.

In one or more embodiments, said second feedback loop can include a transistor (for example, transistor 16a) positioned with its current path (for example, source-drain if the transistor is a FET such as a MOSFET) between the output of the charge pump and the output capacitance.

In one or more embodiments, said transistor can have a control terminal (for example, a gate, if the transistor is a FET such as a MOSFET) driven by a differential stage (for example, 16b) sensitive to the reference voltage on the reference terminal of the input stage and to a submultiple equal to said multiple N (i.e. VOUT/N) of the output voltage of the circuit.

One or more embodiments can include a voltage divider (for example, voltage divider 16c) between the output capacitance and said differential stage, said voltage divider having a division ratio (i.e. by which value the output of the divider is divided with respect to the input of the divider) equal to said multiple N.

In one or more embodiments, the input stage can include a first feedback input (for example, circuit 101a) coupled to the output of the charge pump, a second feedback input (for example, circuit 101b) coupled to the output capacitance, and a summing node (for example, node 102) coupled to said first and second feedback input in such a way that the input voltage applied by the input stage to the charge pump is a function (for example, by the stage 103) of the feedback signals on said first and second feedback input of the input stage.

One or more embodiments can include a first voltage divider (for example, voltage divider 14) between the output of the charge pump and the first feedback input of the input stage, and a second voltage divider (for example, voltage divider 16c) between the output capacitance and the second feedback input of the input stage (e.g., the differential stage 10).

In one or more embodiments, said first and second voltage divider can have respective division ratios (i.e. by which values the output of the divider is divided with respect to the input of the divider) with deviations of opposite sign (for example, the deviations or offsets −ΔR1, +ΔR2 with respect to R1 and R2) with respect to said multiple N.

One or more embodiments can include a voltage divider (for example, the divider 16c) coupled to the output capacitance and having a first tap point (for example, R2) towards said differential stage (for example, 16b) and a second tap point (for example, R2+ΔR2) towards the second feedback input (101b) of the input stage.

In one or more embodiments, an electronic device (for example, a sensor) can include a charge pump circuit according to any of the preceding claims.

One or more embodiments can relate to a method including providing a circuit with: a charge pump with an input voltage and an output voltage which is a multiple N of the input voltage, the charge pump having a clock input, an input stage with a reference terminal for receiving a reference voltage and an output terminal coupled to the charge pump for applying the input voltage to the charge pump, at least one output capacitance coupled to the charge pump and chargeable to an output voltage of the circuit. The method includes providing a first feedback of the output voltage of the charge pump towards the input of the input stage and a second feedback for maintaining a fixed offset between the output voltage of the charge pump and the output voltage of the circuit. Additionally or alternatively, the method may include dividing said output capacitance between two output capacitors with a switch interposed between the two output capacitors, opening the switch at switching edges of the clock signal at the clock input of the charge pump.

The underlying principles remaining the same, the details of construction and forms of embodiment may be varied, even significantly, with respect to those illustrated here purely by way of non-limiting example, without thereby departing from the scope of protection.

Such scope of protection is defined by the accompanying claims.

What is claimed is:

1. A circuit, comprising:
   a charge pump configured to receive an input voltage at an input terminal and a clock signal at a clock input, the charge pump being further configured to produce a first output voltage that is a multiple of the input voltage by a factor N, where N is greater than one;
   an input stage comprising a reference terminal configured to receive a reference voltage, and an output terminal configured to provide the input voltage to the charge pump;
   a capacitive element coupled to the charge pump and chargeable to a second output voltage that is the output voltage of the circuit; and
   a feedback network comprising a first feedback loop separate from the capacitive element and configured to feed back the first output voltage to an input of the input stage, and a second feedback loop separate from and resistively coupled to the capacitive element and configured to maintain a fixed voltage non-zero offset between the first output voltage and the second output voltage, wherein the second feedback loop comprises:
      a transistor having a current path coupled between an output of the charge pump and the capacitive element; and
      a differential stage configured to drive a control terminal of the transistor so as to set the output voltage of the circuit.

2. The circuit according to claim 1, wherein the capacitive element comprises a first output capacitor, a second output capacitor, and a switch coupled between the first output capacitor and the second output capacitor, and wherein the circuit further comprises a driver circuit having an input coupled to the clock input of the charge pump, the driver circuit being configured to open the switch at switching edges of the clock signal.

3. The circuit according to claim 2, wherein the first output capacitor is coupled in parallel to the second output capacitor.

4. The circuit according to claim 1, wherein the differential stage comprises a first input configured to receive the reference voltage and a second input configured to receive a voltage that is equal to the second output voltage scaled down by the factor N.

5. The circuit according to claim 4, wherein the second feedback loop further comprises a voltage divider between the capacitive element and the differential stage, the voltage divider having a division ratio equal to the factor N.

6. The circuit according to claim 1, wherein the input stage comprises:
   a first feedback input coupled, via the first feedback loop, to an output of the charge pump;
   a second feedback input coupled, via the second feedback loop, to the capacitive element; and
   a summing node coupled to the first feedback input and the second feedback input, the input voltage being a function of feedback signals on the first feedback input and the second feedback input.

7. The circuit according to claim 6, wherein the first feedback loop comprises a first voltage divider between the output of the charge pump and the first feedback input, and wherein the second feedback loop comprises a second voltage divider between the capacitive element and the second feedback input.

8. The circuit according to claim 7, wherein the first voltage divider and the second voltage divider have respective division ratios with deviations of opposite sign with respect to the factor N.

9. The circuit according to claim 7, wherein the second voltage divider comprises a first tap point towards a differential stage, and a second tap point towards the second feedback input.

10. A method, comprising:
    providing, by an input stage, an input voltage to an input terminal of a charge pump, the input stage comprising a reference terminal configured to receive a reference voltage, and an output terminal configured to provide the input voltage;
    generating a first output voltage at an output terminal of the charge pump in response to a reception of the input voltage, the first output voltage being a multiple of the input voltage by a factor N, the charge pump being further configured to receive a clock signal at a clock input;
    charging a capacitive element, coupled to the output terminal of the charge pump, to a second output voltage;
    feeding back, via a first feedback loop separate from the capacitive element, the first output voltage to an input of the input stage;
    maintaining, via a second feedback loop separate from and resistively coupled to the capacitive element, a fixed non-zero voltage offset between the first output voltage and the second output voltage;
    generating a current path using a transistor of the second feedback loop, the current path being coupled between an output of the charge pump and the capacitive element; and
    driving a control terminal of the transistor using a differential stage of the second feedback loop so as to set the second output voltage.

11. The method according to claim 10, wherein the capacitive element comprises a first output capacitor, a second output capacitor, and a switch coupled between the first output capacitor and the second output capacitor, the method further comprising opening the switch at switching edges of the clock signal using a driver circuit having an input coupled to the clock input of the charge pump.

12. The method according to claim 10, wherein the differential stage comprises a first input configured to receive the reference voltage and a second input configured to receive a voltage that is equal to the second output voltage scaled down by the factor N.

13. A circuit, comprising:
a charge pump comprising an input terminal configured to receive an input voltage, and a clock input configured to receive a clock signal at a clock input, the charge pump being configured to generate a first output voltage that is a multiple N of the input voltage, where N is greater than one;
an input stage comprising a reference terminal configured to receive a reference voltage, and an output terminal configured to provide the input voltage to the charge pump;
a capacitive element coupled to an output terminal of the charge pump and chargeable to a second output voltage that is the output voltage of the circuit, wherein the capacitive element comprises a first output capacitor and a second output capacitor coupled in parallel to the first output capacitor;
a switch coupled between the first output capacitor and the second output capacitor;
a driver circuit having an input coupled to the clock input of the charge pump, the driver circuit being configured to open the switch at switching edges of the clock signal; and
a feedback network comprising:
a first feedback loop separate from the capacitive element and configured to feed back the first output voltage to an input of the input stage; and
a second feedback loop separate from and resistively coupled to the capacitive element and configured to maintain a fixed non-zero voltage offset between the first output voltage and the second output voltage, wherein the second feedback loop comprises:
a transistor having a current path coupled between the output terminal of the charge pump and the capacitive element; and
a differential stage configured to drive a control terminal of the transistor.

14. The circuit according to claim 13, wherein the second output voltage is greater than the first output voltage.

15. The circuit according to claim 13, wherein the input stage comprises:
a first feedback input coupled to an output terminal of the charge pump;
a second feedback input coupled to the capacitive element; and
a summing node coupled to the first feedback input and the second feedback input, the input voltage being a function of feedback signals on the first feedback input and the second feedback input.

16. The circuit according to claim 15, wherein the first feedback loop comprises a first voltage divider between the output terminal of the charge pump and the first feedback input, and wherein the second feedback loop comprises a second voltage divider between the capacitive element and the second feedback input.

17. The circuit according to claim 13, wherein the differential stage comprises a first input configured to receive the reference voltage and a second input configured to receive a voltage that is equal to the second output voltage scaled down by a factor equal to the multiple N.

18. A circuit, comprising:
an input stage comprising a reference terminal configured to receive a reference voltage, and an output terminal configured to provide a first output voltage;
a charge pump comprising
an input terminal coupled to the output terminal of the input stage,
a clock input configured to receive a clock signal, and
an output terminal configured to output a second output voltage that is a multiple N of the first output voltage, where N is greater than one;
a differential stage comprising
a first input terminal configured to receive the reference voltage, and
an output terminal;
a transistor comprising
a control terminal coupled to the output terminal of the differential stage, and
an output terminal;
a first output capacitor coupled to the output terminal of the transistor and configured to output a third output voltage that is the output voltage of the circuit;
a first feedback path separate from the first output capacitor coupling the output terminal of the charge pump to a first input terminal of the input stage; and
a second feedback path separate from the first output capacitor and resistively coupled to the first output capacitor coupling the output terminal of the transistor to a second input terminal of the input stage.

19. The circuit according to claim 18, wherein the transistor comprises an input terminal coupled to the output terminal of the charge pump.

20. The circuit according to claim 19, further comprising a voltage divider comprising a first terminal coupled to the output of the transistor, a first tap point configured to be coupled to the second feedback path, and a second tap point configured to be coupled to a second input terminal of the differential stage, wherein the differential stage, the transistor, the voltage divider, and the second feedback path form part of a second feedback loop.

21. The circuit according to claim 18, further comprising a voltage divider comprising a first terminal coupled to the output of the charge pump and a second terminal coupled to the first feedback path, wherein the voltage divider and the first feedback path form part of a first feedback loop.

22. The circuit according to claim 18, further comprising a second output capacitor coupled in parallel to the first output capacitor.

23. The circuit according to claim 18, wherein the differential stage is powered by the second output voltage from the charge pump.

* * * * *